Aug. 12, 1958   L. P. ENGLISH   2,847,557
STUD WELDING CIRCUIT
Filed June 27, 1955   2 Sheets-Sheet 1

INVENTOR
Lawrence P. English

BY Brown and Mikulka
ATTORNEYS

Aug. 12, 1958 L. P. ENGLISH 2,847,557
STUD WELDING CIRCUIT

Filed June 27, 1955 2 Sheets-Sheet 2

INVENTOR
Lawrence P. English
BY Brown and Mikulla
ATTORNEYS

United States Patent Office 2,847,557
Patented Aug. 12, 1958

2,847,557

STUD WELDING CIRCUIT

Lawrence P. English, Haddon Heights, N. J., assignor to KSM Products, Inc., Merchantville, N. J., a corporation of New Jersey Application June 27, 1955, Serial No. 518,035

4 Claims. (Cl. 219—98)

This invention relates to electric arc welding, and more particularly to stud welding apparatus including a stud welding gun and means for energizing and controlling the operation of said gun.

One object of the present invention is to provide a stud welding apparatus equipped with novel means for controlling and energizing the said apparatus including means for operating the lift-imparting means of the stud welding gun from an A. C. source.

Another object is to provide an apparatus of the aforesaid type wherein the stud welding gun comprises a solenoid-actuated, lift-imparting means and the control circuit therefor includes a rectifier for converting energy delivered from said A. C. source to the solenoid.

Still another object is to provide a control circuit of the aforesaid type in a stud welding apparatus wherein the solenoid-actuated, lift-imparting means comprises a movable and a stationary core and in lift position said cores are separated a predetermined distance apart in order to make possible a more accurate control of the lift of the stud.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The novel stud welding control circuit of the present invention is illustrated by way of example for energizing and controlling the operation of a welding gun of the semi-automatic pistol type, although it will be apparent that it may be embodied in units comprising other forms of guns, for example of the automatic and stationary types. In its preferred form, the novel stud welding apparatus of the present invention combines a solenoid-actuated lifting means with a control and energization circuit which connects the solenoid to a source of alternating current through a rectifier and separately connects the stud holder to a source of welding current. As a result, the welding current is unaffected by the loading of the solenoid and creates a more reliable and uniform arc during the welding cycle and a conventional A. C. source can be employed to energize the control circuit. Moreover, because of the inclusion of a rectifier in the solenoid-actuating circuit these advantages are realized without any adverse effect upon the operation of the solenoid during actuation of the lift of the stud. The use of the rectifier is especially advantageous in combination with a welding gun having the novel structure herein described and claimed per se in the copending application of Frank K. Kelemen et al., Serial No. 518,032, for "Stud Welding Apparatus," filed concurrently herewith, now Patent No. 2,796,513, dated June 18, 1957.

Figure 1:
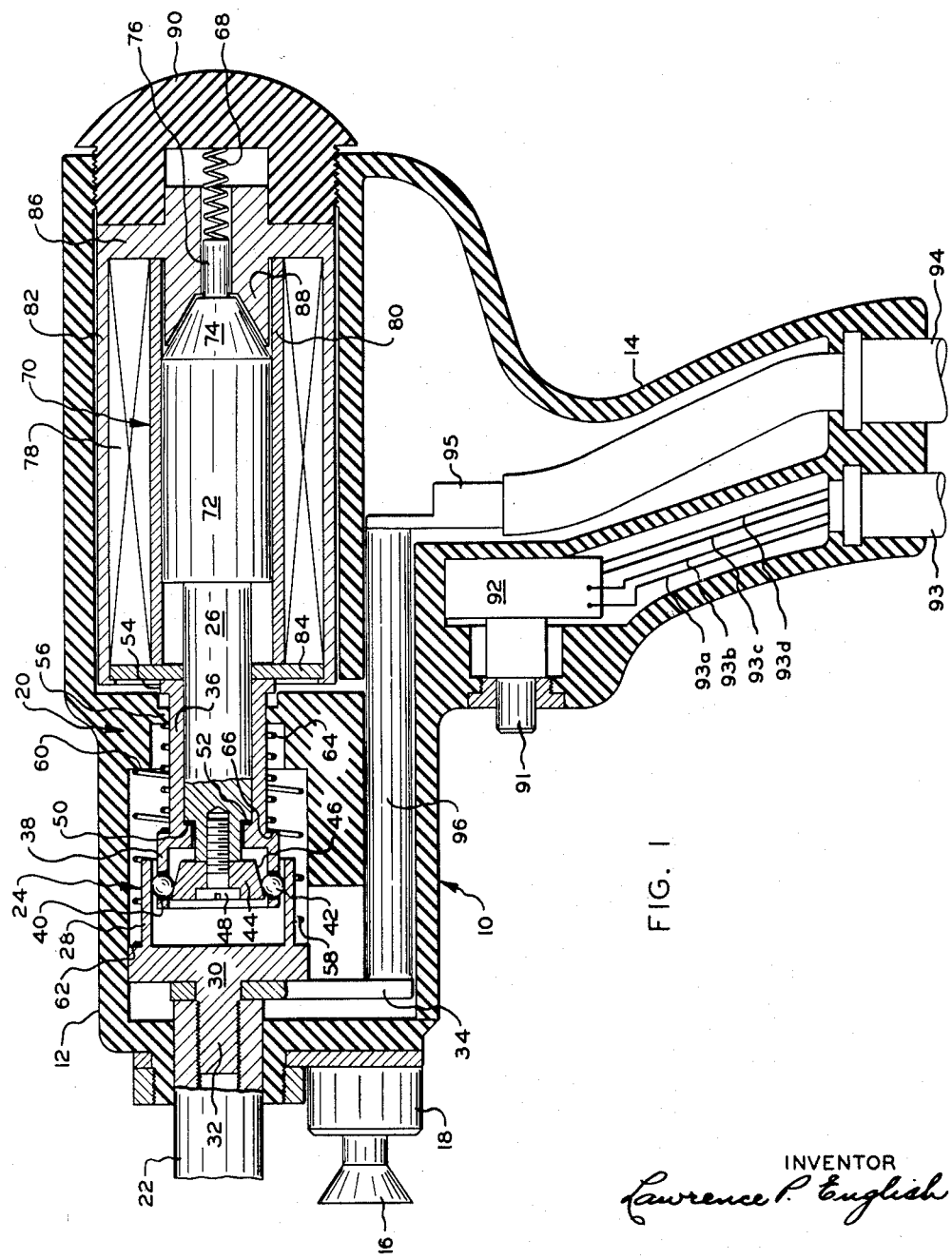
Figure 1 is a view, partly in section and partly in elevation, of one form of welding gun adapted to constitute a component of the apparatus of the present invention, the section being taken along the main longitudinal axis of said gun.
Figures 2, 3:
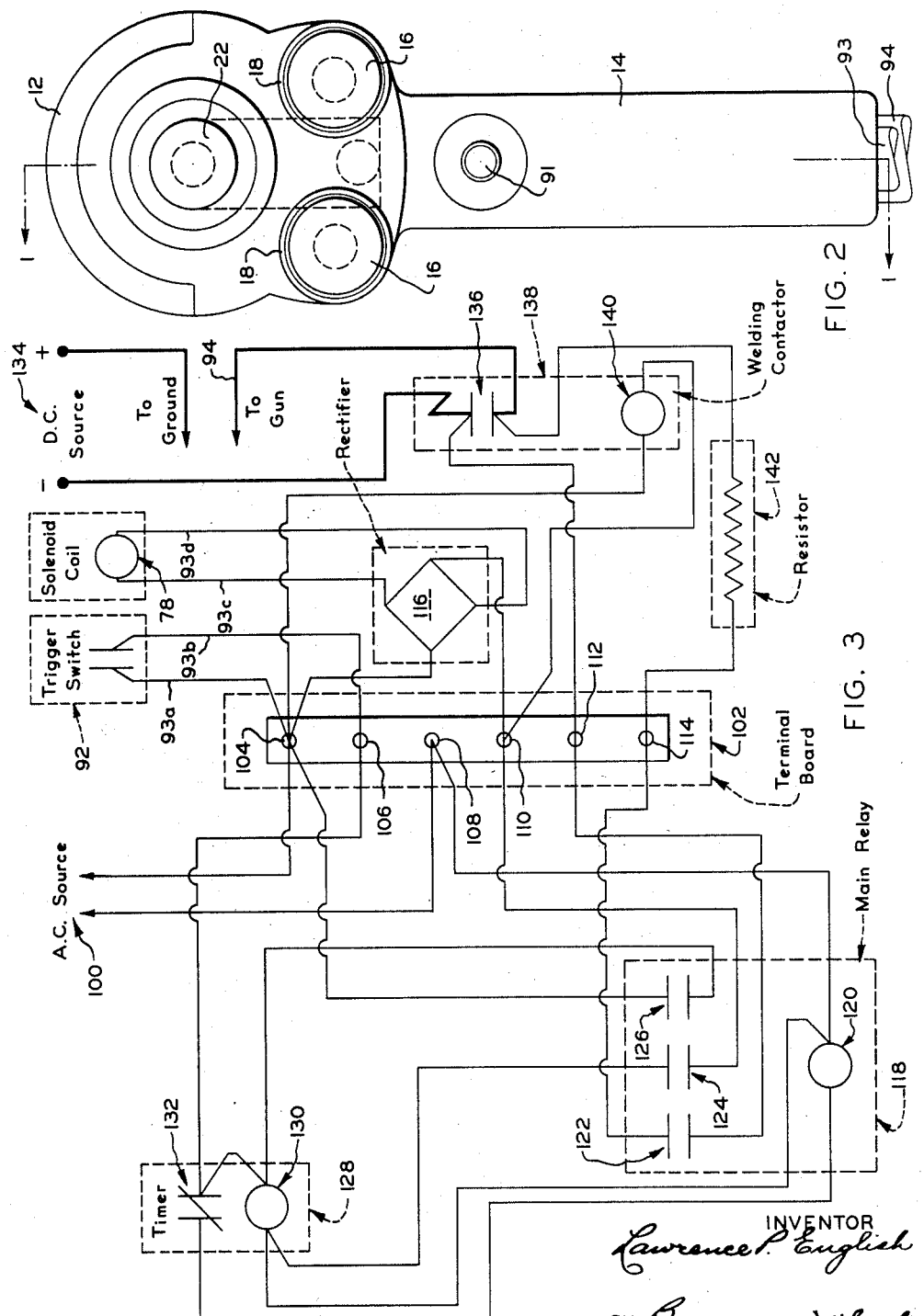
Fig. 2 is an end elevational view illustrating the front end of the gun.
Fig. 3 is a wiring diagram illustrating schematically one form of electrical circuit embodying the novel control and energization system of the present invention.

Referring now to the drawings, and specifically to Figs. 1 and 2, there is shown one form of gun structure especially suited for use with the control circuit of the present invention. As shown, said structure comprises a main housing 10, preferably formed of an electrically nonconducting material, such as plastic for example, of the thermo-setting phenolic type. Housing 10 comprises a generally cylindrical barrel 12 and, in its preferred form, a handgrip or handle 14, and is preferably formed of two or more sections so that it can be easily disassembled to permit ready access to the operating elements contained therein. Slidably mounted in barrel 12, preferably beneath the main longitudinal axis thereof and symmetrically arranged with respect to the plane of said axis, are a pair of leg members 16. These are mounted for ready adjustment to any desired length, and suitable means (not shown) manually operable from the exterior of the gun, as by means of knurled nuts 18, are provided for fixing said legs against movement in any given position thereof.

Barrel 12 is provided with a main longitudinal bore open at both ends and has an intermediate inwardly-extending section 20 which separates said bore into essentially two chambers. Slidably mounted in the front open end of said barrel are stud-holding means 22 which may comprise a chuck adapter, a chuck and a spring, and which operatively mounts the stud and the arc shield. The stud is fixed in the stud holder 22 so as to be movable therewith. Movably mounted in the chamber between section 20 and the front end of gun barrel 12 is a novel connecting mechanism 24 which is adapted to connect together stud holder 22 and a suitable lifting member 26. As shown, mechanism 24 comprises a ball-engaging barrel 28 which is preferably integrally formed with and extends rearwardly from a screw member 30 whose threaded shank 32 is screwed into a threaded bore provided therefor in stud holder 22. Members 30 and 22 are formed of conducting material, preferably a metal such as steel, and barrel 28 is suitably heat-treated so that the internal surface thereof has excellent wear resistance. Clamped between the forward wall of the head of screw member 30 and the end of stud holder 22 is a welding current conductor 34 which is suitably connected to the source of welding current by means to be more fully described hereinafter.

Slidably mounted for movement substantially coaxially with said stud holder 22 and lifting member 26 is a sleeve 36, biased in plunge direction and provided with a forward cylindrical portion 38 of enlarged diameter, said portion being equipped with a plurality of recesses 40 and serving as a cage to operatively mount a plurality of balls 42 in said recesses. Two balls have been shown in Fig. 1 in order to illustrate that a plurality of such balls are carried by the cage 38 and that these are equally spaced around the periphery thereof to provide a uniform distribution of the lifting forces exerted thereby when in operation. Three balls 120° apart constitute a preferred arrangement. Ball cage 38 has an outer diameter which is sufficiently smaller than the internal diameter of the ball-engaging surface of barrel 28 within which it fits to preclude any appreciable surface contact, and the internal diameter of the rear portion of sleeve 36 is sufficiently larger than the external diameter of the portion of the lifting member 26 which it surrounds to prevent any appreciable frictional engagement therebetween.

Rigidly mounted on the forward end of lifting member 26 is a ball-engaging member 44 provided with a tapered ball-engaging peripheral surface 46, the diameter of said surface descreasing in the direction of said lifting member. Member 44 may be secured to or integrally formed with lifting member 26 and, as shown, a screw 48 extending through member 44 and threaded into the end of member 26 effects the desired union between said members.

Balls 42 are adapted to be engaged by tapered surface 46 when the latter is moved in lift direction relative to cage 38 and this engagement forces said balls radially outward into engagement with the internal surface of barrel 28. This tends to lock together the ball-engaging members 44 and 28 and the elements secured thereto, namely, lifting member 26 and stud holder 22 and renders mechanism 24 operative.

An internal shoulder 50 is formed in the forward end of sleeve 36 adjacent cage 38 and is adapted to engage a shoulder 52 in the forward end of member 26 to provide a stop for the movement in plunge direction of lifting member 26 relative to sleeve 36. At the rear end of sleeve 36 an outwardly extending flange 54 is provided and is adapted to engage an inwardly extending flange 56 in intermediate section 20 of the housing in its movement in plunge direction whereby said flange 56 fixes the foremost position of sleeve 36 relative to housing 10.

A main spring 58 normally biases member 30 and stud holder 22 along therewith in a plunge direction, said spring being held under compression between a shoulder 60 provided by intermediate section 20 of the housing and a shoulder 62 of member 30.

In a preferred form of the connecting mechanism, when shoulders 50 and 52 are in engagement, mechanism 24 is inoperative, i. e., balls 42 are inoperative to effect frictional engagement between barrel 28 and member 44. Thus, so long as shoulder 52 is held in engagement with shoulder 50, barrel 28 and hence stud holder 22 is free for movement in either direction relative to lifting member 26. A spring 64, located between internal shoulder 56 and an external shoulder 66, provided by the base of ball cage 38, normally biases sleeve 36 in a plunge direction. A further spring 68, which exerts a sufficient biasing force upon lifting member 26 to overcome the weight thereof, urges said member in a plunge direction so that normally shoulder 52 engages shoulder 50 and maintains connecting mechanism 24 inoperative.

Suitable means are provided in the gun structure to apply a lifting force to member 26 and in the form shown said means comprise a solenoid 70. Lifting member 26 is the movable core of said solenoid and includes a portion 72 of enlarged diameter, a tapered portion 74 and a rear portion 76 of diminished diameter. Surrounding movable core 26 is the solenoid coil 78 which is housed in a metallic structure comprising an internal cylindrical sleeve 80, for example of brass, an external sleeve 82, for example of steel, a front plate 84, rear wall 86 and a stationary core 88. Stationary core 88, read wall 86 and outer sleeve 82 may be integrally formed and this integral structure is preferably provided with an internal bore that slidably receives core portion 76.

A cap member 90 threads into the opening at the rear of gun barrel 12, said member 90 being preferably formed of an electrically nonconducting material as, for example, the same plastic material from which the gun housing is formed. Spring 68 which biases movable core 26 in a plunge direction is preferably mounted between the end of said reduced portion 76 of the movable core and the inner wall of said cap 90. Cap 90 is preferably secured to stationary core 88 and rear wall 86 so that said cap, stationary core 88, wall 86 and sleeve 82 move as a unit. However, plate 84, inner sleeve 80 and solenoid coil 78 are free to move angularly with respect to the remainder of the solenoid housing but are restrained by outer sleeve 82 so as to move axially along with said outer sleeve. Plate 84 abuts against one end of inner sleeve 80 and the other end of said sleeve abuts against wall 86 so that the axial position of the front surface of plate 84 is precisely fixed in the gun housing in relation to the stationary core 88 of the solenoid and the axial position of plate 84 may be controlled by adjusting the position of cap member 90. By mounting plate 84 and solenoid coil 78 so that the latter are not rotated along with sleeve 82, adjustment of cap 90 leaves unaffected the electrical connections which are made to the solenoid coil through plate 84 despite the rotation of sleeve 82.

To precisely control the lift of the stud and prevent over-travel of stud holder 22 relative to lifting member 26, sleeve 36 is so formed and mounted in relation to lifting member 26 and stationary core 88 that during the lift the end of said sleeve 36 engages plate 84 and is positively stopped thereby before the end of movable core 74 engages stationary core 88. It is to be observed that adjustment of the total lift may be obtained by adjusting the position of plate 84 by means of cap 90 but that such adjustment does not affect the aforementioned sequence of operations because the axial position of plate 84 is fixed relative to the axial position of stationary core 88. By having sleeve 36 engage and be positively stopped before lifting member 26 engages any stops, the stopping force is transmitted through said sleeve to balls 42 in a direction which tends to augment the wedging action between the plate-engaging surfaces of elements 44 and 28. Stud holder 22 is thus rigidly secured through member 30, balls 42 and member 44 to lifting member 26 and any overtravel of holder 22 relative to member 26 is prevented.

Disposed in handgrip 14 of the housing, in a position to be readily engaged by the finger of the gun operator, is a trigger in the form of a push button 91 which, when depressed, is adapted to actuate a control switch 92. A pair of electrical cables 93 and 94 preferably extend through the bottom of the handgrip into the housing to effect the necessary electrical connections. Cable 94 provides the welding current and is connected by means of a connector element 95 to a conducting rod 96 which in turn is affixed to and makes contact with conductor 34. The structure comprising conductor 34, rod 96 and connector 95 is freely movable longitudinally of the gun barrel 12 along with stud holder 22, cable 94 being sufficiently flexible and having enough play in the gun handle to permit such free movement. Cable 93 carries four control wires 93a, 93b, 93c and 93d, wires 93a and 93b being connected to switch 92 and wires 93c and 93d extending upward through the gun housing to connect with solenoid coil 78 through plate 84.

The gun of Fig. 1 is shown in lift position with flange 54 engaging plate 84 and mechanism 24 locked in operative position. However, at the beginning of the stud welding cycle, stud holder 22 is in its foremost position in plunger direction, being held in this position by the pressure of spring 58. Under the influence of spring 64, sleeve 36 and the balls carried thereby are also urged into their foremost position in plunge direction. Similarly, lifting member 26 is biased by spring 58 in this same direction and, as noted hereinabove and because of the engagement of shoulders 50 and 52, connecting mechanism 24 is inoperative to effect engagement between member 44 and barrel 28. In this position, therefore, stud holder 22 is free to be moved axially against the bias of spring 58 and is so displaced initially as the stud and arc shield held by holder 22 are positioned in engagement with the plate or other body member to which the stud is to be secured. Thereafter, by depressing trigger 91 the welding cycle is begun and the energization of solenoid 78 moves member 26 in a lift direction while sleeve 36 continues to be biased in plunge direction by its spring 64. As a result, when lifting member 26 has moved a predetermined, constant short distance in lift direction, balls 42 frictionally engage and are wedged between the surface 46 of member 44 and the internal surface of barrel 28. This locks together lifting member 26 and stud holder 22 and begins the lift of the latter. The lift is terminated when the end of flange 54 of sleeve 36 abuts against plate 84 and renders more positive the locking engagement between the stud holder 22 and the lifting member 26. The elements are so held as long as solenoid 78 remains energized.

Upon the deenergization of the solenoid coil, stud holder 22, sleeve 36 and lifting member 26 are moved in a plunger direction under the influence of their respective springs and the stud held by said holder is plunged into engagement with the body member, completing the weld cycle.

The novel controls and connecting circuits for the gun structure are shown diagrammatically in Fig. 3. As shown, said controls comprise an A. C. source 100, a control or terminal board 102 comprising six terminals 104, 106, 108, 110, 112 and 114, said A. C. source being connected across terminals 104, 108 of said board. Trigger switch 92 of the gun is connected to terminals 104 and 106 of the board and a full wave rectifier 116 has two terminals thereof connected to terminals 104 and 110, respectively, of said board and the other two terminals connected to solenoid coil 78. A main control electromagnetic relay 118 is provided and comprises actuating coil 120 and relay switches 122, 124 and 126 having normally open contacts and adapted to be closed upon energization of said coil. The contact points of switch 122 are so adjusted in relation to those of switches 124 and 126 that upon energization of coil 120 switch 122 will close a predetermined short interval before switches 124 and 126. A timing means 128, for example of the electropneumatic type, is included in the circuit and comprises coil 130 and a normally closed switch 132 so connected to coil 130 by suitable pneumatic means as to be opened a predetermined time after said coil is energized. It is to be noted that coil 120, which controls switches 122, 124 and 126, is connected to the source of alternating current via terminals 108 and 104, switch 92 and switch 132, and coil 130 is connected to the A. C. source via terminal 106, switch 92 and terminals 104 and 108. This gives a positive control over the timing of the welding cycle as will appear more fully hereinafter.

To provide the welding current, a source of energy 134 has one of its terminals connected to ground and the other connected through a switch 136 to the welding gun, as by means of cable 94. Switch 136 is the switch means of a welding contactor 138 which includes coil 140, of the time-delayed type, adapted to close the contact points of switch 136 a very short interval after it is energized, said coil being connected to terminals 104 and 110 of the terminal board. Accordingly, the closing of contact points 124 energizes coil 140 and closes switch 136 and makes available to the welding gun the full welding current from source 134. To provide a current of lesser magnitude which serves to produce a pilot arc just immediately prior to the flow of the full welding current, a circuit comprising resistor 142 and switch 122 is connected across the terminals of switch 136. As a result, when switch 122 closes, which as hereinabove noted, occurs just prior to the closing of switch 124, a current of diminished magnitude, due to the presence of resistor 142, is caused to flow from source 134 to the gun. It is also to be noted that the closing of switch 126 creates a circuit in parallel with trigger switch 92 which maintains the flow of current through coil 120 even if the operator releases the trigger.

In operation, therefore, the operator actuates trigger 91 (Fig. 1) and closes switch 92 causing current to flow from source 100 to magnetic relay 118 energizing coil 120 thereof. Switch 122 is first closed and, as noted above, effects a connection through resistor 142 to the source of welding current and provides energy for a pilot arc. Shortly thereafter, switches 124 and 126 close. The closing of switch 124 closes the circuit from the A. C. source to rectifier 116 supplying direct current to the solenoid coil 78 and initiating the lift of the stud. Simultaneously coil 140 is energized through the same switch 124 and shortly thereafter closes switch 136, thus short circuiting the pilot circuit through resistor 142 so that after the lift begins the full welding current becomes available to the gun to create an arc of full intensity.

At the end of the interval for which timer 128 is set, switch 132 opens, breaking the circuit through and deenergizing coil 120. This opens switches 122, 124 and 126 and thereby, in turn, deenergizes the solenoid coil and interrupts the flow of welding current to the gun including that through the pilot circuit. The stud holder is thus rendered free to move under the force of the main spring of the gun in plunge direction to complete the weld cycle. It is significant in this respect that the opening of switch 132 is effective to terminate the weld cycle even if the operator has continued to maintain trigger switch 92 closed.

It is to be noted that in order to avoid any possibility of a premature flow of full welding current which might create a resistance weld, welding contactor 138 of the foregoing circuit is of the time-delayed type. A more conventional type of contactor without a built-in delay could also be used in which case there is interposed in the circuit, between this contactor and switch 124, a supplementary relay switch which is adapted to be actuated by the closing of switch 124 and which, when actuated, operates the said welding contactor. This extra relay switch introduces the minute delay between the actuation of solenoid coil 78 and the closing of the contact points of the welding contactor which is desired in order to preclude a premature flow of the full welding current.

A significant novel feature of this circuit is the inclusion therein of a D. C. rectifier, such as rectifier 116, which makes possible the use of an independent A. C. control circuit without any of the disadvantages which derive from a direct application of alternating current to the operation of a solenoid coil. For example, as noted hereinabove, to successfully prevent the overtravel of stud holder 22 it is essential that sleeve 36 be positively stopped before movable core 76 of the solenoid engages stationary core 88. This requires that there be, in the lift position of the solenoid, a spacing between the movable and the stationary solenoid cores, a condition which is difficult to achieve without chatter or similar deleterious effects in an A. C. solenoid coil. This disadvantage has been avoided by the novel expedient of including a rectifier between the source of alternating current and the solenoid coil while rendering the operation of the coil more precise because it is independent of the fluctuations of the direct current which exist when the solenoid is connected directly to the source of welding current.

Since certain changes may be made in the above apparatus without departing from the scope of the invention herein involved, it is intended that all matter contained in the above description, or shown in the accompanying drawings, shall be interpreted as illustrative and not in a limiting sense.

What is claimed is:

1. In a stud welding apparatus comprising a welding gun which includes means for holding a stud and means, including a solenoid, for moving said stud-holding means in lift direction, the combination with said gun of means for operatively connecting a source of welding current thereto, control means adapted to be connected to a source of alternating current independent of said welding source for operating said welding gun, said control means comprising a rectifier adapted to be connected with said alternating current source for supplying direct current to said solenoid, said rectifier being connected in series with only a predetermined resistance and the coil of said solenoid, and means including a main switch and relay switches, said last-named means being actuated by said alternating current in response to the operation of said main switch to control the energization of said solenoid and the passage of said welding current to said gun.

2. In a stud welding apparatus comprising a welding gun which includes stud-holding means and means for moving said stud-holding means in lift direction, said last-named means comprising a solenoid coil, a stationary solenoid core and a movable solenoid core, said cores being separated by a predetermined distance when said stud-holding means has been moved to its fully retracted lift position, the combination with said gun of a source of welding current, means including a main and a pilot circuit for connecting said source to a stud held by said holding means, a source of alternating current independent of said welding source, control means adapted to be connected to said alternating current source for controlling the operation of said welding gun and the timing of the welding cycle performed by said gun, said control means comprising a rectifier adapted to be connected with said alternating current source for supplying direct current to said solenoid coil, said rectifier being connected in series with only said solenoid coil and a predetermined resistance, a main switch and relay switches, said control means being actuated by said alternating current in response to the operation of said main switch and being operated by said relay switches to time the energization of said solenoid coil and the passage of said welding current to the stud, and means rendered operative by said control means in response to the actuation of said main switch for first connecting the stud to said welding source through said pilot circuit to initiate the welding arc and thereafter connecting the stud to said welding source through said main circuit.

3. The stud welding apparatus of claim 1 wherein said predetermined resistance connected in series with said rectifier and said coil of said solenoid is of slight value and comprises the resistance offered by the electrical conductors connecting said rectifier with said solenoid coil.

4. The stud welding apparatus of claim 2 wherein said predetermined resistance connected in series with said rectifier and said coil of said solenoid is of slight value and comprises the resistance offered by the electrical conductors connecting said rectifier with said solenoid coil.

References Cited in the file of this patent

UNITED STATES PATENTS

| 2,191,494 | Nelson | Feb. 27, 1940 |
| 2,265,169 | Hughes et al. | Dec. 9, 1941 |
| 2,342,144 | Hughes | Feb. 22, 1944 |
| 2,413,189 | Nelson | Dec. 24, 1946 |
| 2,648,748 | Sayer | Aug. 11, 1953 |

FOREIGN PATENTS

| 707,545 | Great Britain | Apr. 21, 1954 |